(12) United States Patent
Zhuan et al.

(10) Patent No.: US 9,195,226 B2
(45) Date of Patent: Nov. 24, 2015

(54) APPARATUS AND METHOD FOR DETECTING POSITION DRIFT IN A MACHINE OPERATION USING A ROBOT ARM (71) Applicant: Sigenic Pte Ltd, Singapore (SG)

(72) Inventors: Koh Min Zhuan, Singapore (SG); Eugene Chong Wui Chyun, Singapore (SG)

(73) Assignee: Sigenic PTE Ltd, Singapore (SG)

( * ) Notice: Subject to any disclaimer, the term of this patent is extended or adjusted under 35 U.S.C. 154(b) by 0 days.

(21) Appl. No.: 14/230,601

(22) Filed: Mar. 31, 2014

(65) Prior Publication Data

US 2014/0303776 A1 Oct. 9, 2014

(30) Foreign Application Priority Data

Apr. 5, 2013 (SG) ................. 201302577-0

(51) Int. Cl.
 *G05B 15/00* (2006.01)
 *G05B 19/00* (2006.01)
 *G05B 19/401* (2006.01)

(52) U.S. Cl.
 CPC .... *G05B 19/401* (2013.01); *G05B 2219/45031* (2013.01)

(58) Field of Classification Search
 CPC ............ B25J 3/00; B25J 13/02; B25J 9/1653; B25J 9/16; A61B 19/00; A61B 19/2203; A61B 2019/467; A61B 2019/2223
 USPC ............. 700/245, 251, 254, 258; 318/568.11, 318/568.12, 568.16, 568.21; 414/816; 901/46
 See application file for complete search history.

(56) References Cited

U.S. PATENT DOCUMENTS

| 5,844,683 | A | * | 12/1998 | Pavloski et al. | ............... 356/399 |
| 6,198,976 | B1 | * | 3/2001 | Sundar et al. | .................. 700/59 |
| 6,237,393 | B1 | * | 5/2001 | Ames et al. | ..................... 73/1.79 |
| 6,425,280 | B1 | * | 7/2002 | Ames et al. | ..................... 73/1.79 |
| 6,633,046 | B1 | * | 10/2003 | Mitchell et al. | .......... 250/492.21 |
| 7,008,802 | B2 | * | 3/2006 | Lu | ..................... 438/7 |
| 8,731,718 | B2 | * | 5/2014 | Rodnick | ........................ 700/253 |
| 8,958,907 | B2 | * | 2/2015 | Saeki et al. | .................... 700/245 |
| 2001/0014271 | A1 | * | 8/2001 | Si et al. | .................... 414/416.08 |
| 2002/0068992 | A1 | | 6/2002 | Hine et al. | |
| 2004/0151574 | A1 | * | 8/2004 | Lu | .................. 414/816 |
| 2004/0249507 | A1 | | 12/2004 | Yoshida et al. | |
| 2005/0096794 | A1 | * | 5/2005 | Yim et al. | ..................... 700/258 |
| 2005/0137751 | A1 | * | 6/2005 | Cox et al. | ..................... 700/245 |
| 2005/0184043 | A1 | * | 8/2005 | Paxton et al. | ............. 219/444.1 |

(Continued)

FOREIGN PATENT DOCUMENTS

JP 2007/276113 A 10/2007

*Primary Examiner* — Dalena Tran
*Assistant Examiner* — Jamie Figueroa
(74) *Attorney, Agent, or Firm* — Hamilton, Brook, Smith & Reynolds, P.C.

(57) ABSTRACT

In an example embodiment, apparatus for detecting position drift in a machine operation using a robot arm, the robot arm being for operation on a semiconductor substrate, the robot arm and the semiconductor substrate being configured for relative movement therebetween, the apparatus includes an input for receiving an input signal from a sensor mounted on the robot arm; a detector for detecting, from the input signal, a detection of there being a predefined distance between the robot arm and the semiconductor substrate; wherein the apparatus is configured to determine, from the detection, whether there has been position drift.

10 Claims, 7 Drawing Sheets

(56) References Cited

U.S. PATENT DOCUMENTS

| | | | |
|---|---|---|---|
| 2006/0169208 A1* | 8/2006 | Shinozaki et al. | 118/715 |
| 2006/0208749 A1* | 9/2006 | Otaguro et al. | 324/758 |
| 2007/0176445 A1* | 8/2007 | Kim | 294/64.1 |
| 2010/0070077 A1* | 3/2010 | Le | 700/254 |
| 2010/0094452 A1* | 4/2010 | Ogi | 700/228 |
| 2010/0222923 A1* | 9/2010 | Matsumura | 700/245 |
| 2012/0002216 A1 | 1/2012 | Shibata et al. | |
| 2012/0089251 A1 | 4/2012 | Coady | |
| 2012/0101633 A1* | 4/2012 | Rodnick | 700/253 |
| 2012/0253511 A1* | 10/2012 | Saeki et al. | 700/245 |

* cited by examiner

APPARATUS AND METHOD FOR DETECTING POSITION DRIFT IN A MACHINE OPERATION USING A ROBOT ARM

This application claims priority under 35 U.S.C. §119 or 365 to Singapore Application No. 201302577-0, filed Apr. 5, 2013. The entire teachings of the above application are incorporated herein by reference.

The invention relates to an apparatus for detecting position drift in a machine operation using a robot arm. The invention also relates to a method for detecting position drift in a machine operation using a robot arm. The invention may also relate to an apparatus and method for detecting position drift of a machine component, the machine component being for operation on a target object. The invention has particular, but not exclusive application for the retrieval of a semiconductor substrate from an array of substrates (such as a cassette or rack of substrates) for the substrate to be subjected to, for example, a cleaning operation.

Numerous techniques are known for the position monitoring of a target object during manufacturing processes, just one purpose of this being to detect what is known as "position drift" in machine components. Position drift happens when, over a period of time, a gradual change in position from the desired position of the machine component (as set up during commissioning/calibration) happens. Position drift is highly undesirable because if a machine component has drifted from its desired position, then if the machine operation continues regardless, the machine component may be out of position causing undesirable consequences, such as deficiencies in the manufacturing process or, even worse, damage to product or machine components.

One known technique for monitoring position is discussed with reference to FIG. 6. In this conventional technique, an apparatus 600 detects a position of a semiconductor substrate 602 as it moves through different positions 602a, 602b, and 602c. Apparatus 600 comprises a laser emitter 604 and a CMOS sensor 606. Emitter 604 emits a laser beam 608 in the direction of semiconductor substrate 602 as it moves through the positions illustrated in the direction 609. Thus, laser beam 608 is reflected by substrate 602 when at position 602a such that the reflected beam 610a is received at the CMOS sensor 606 as shown. When substrate 602 is at position 602b, laser beam 608 is reflected by substrate 602 so that the reflected beam 610b is received at CMOS sensor 606 as shown. When substrate 602 is at position 602c, laser beam 608 is reflected by substrate 602 so that the reflected beam 610c is received at CMOS sensor 606 as shown.

Figure 6:
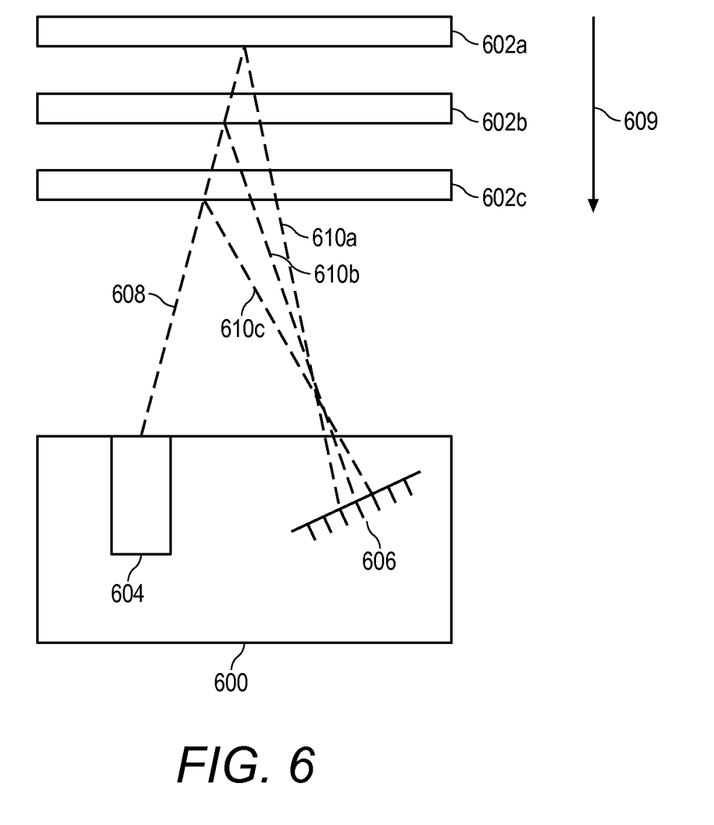
FIG. 6 is a schematic block diagram illustrating a conventional technique for position monitoring in a mechanical operation.

Essentially, the arrangement of FIG. 6 implements a laser triangulation technique and the position of the target—substrate 602—as it moves in the direction 609 is measured by detecting the change in the signal received at CMOS 606.

The arrangement of FIG. 6 is less than optimal for a number of reasons. For instance, laser emitter 604 is generally required to be of relatively high intensity, which runs the risk of diminishing the quality of the substrate at the end of the process. The high cost of the laser sensor makes the arrangement not particularly attractive from an economic standpoint. These laser sensors, being of a relatively high intensity, tend to be rather bulky in size. Further, the use of the laser is potentially harmful to a human eye if the eye is exposed to it.

The invention is defined in the independent claims. Some optional features of the invention are defined in the dependent claims.

Implementation of the techniques disclosed herein offer significant technical advantages in comparison with conventional techniques, particularly that as illustrated in FIG. 6. For instance, the positioning of a sensor mounted on the robot arm responsible for operating on the substrate obviates the requirement for the costly laser sensor illustrated in FIG. 6. Further, positioning of the sensor directly on the robot arm introduces a high degree of accuracy in obtaining readings relating to the robot arm with significant costs savings, particularly when compared with systems such as that illustrated in FIG. 6. This is in contrast to the fact the laser sensor of FIG. 6 is seeking to determine the position of the substrate/robot arm operating thereon remotely by emission of the laser beam and sensing of the reflected beam.

The invention will now be described, by way of example only, and with reference to the accompanying drawings in which.

Figure 1:
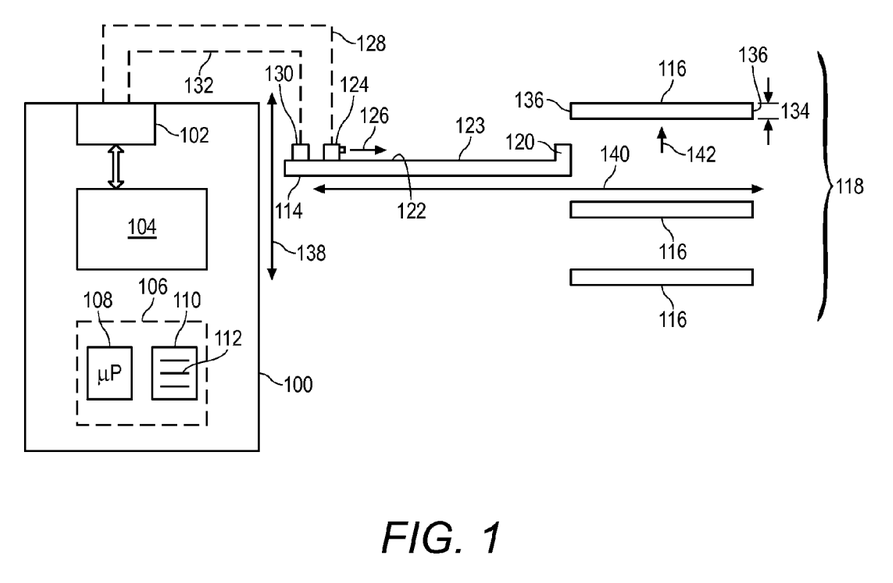
FIG. 1 is a schematic block diagram illustrating an apparatus for detecting position drift in a machine operation using a robot arm, the robot arm being for operation on a semiconductor substrate.

Turning first to FIG. 1, this illustrates an apparatus 100 for detecting position drift in a machine operation using a robot arm. Apparatus 100 comprises an input 102 (which may take the form of an input-output module) and a detector 104, the operation of which will be described below. Only robot arm 114 is illustrated for the sake of clarity, and the remainder of the machine is omitted from view.

Robot arm 114 is provided for operating on one or more of semiconductor substrates 116 arranged in array 118. Typically, the array 118 of semiconductor substrates 116 is such that the substrates 116 are disposed in or on a cassette or rack as will be appreciated by those skilled in the art. The cassette/rack is also omitted from view for the sake of clarity. In this example, the operation robot arm 114 effects on semiconductor substrate 116 is to retrieve it from array 118, but the techniques disclosed herein are applicable for other types of operations. Robot arm 114 has an end portion 120 projecting at a right angle from the main portion of robot arm 114 for the purpose of retrieving the substrate 116 from the array 118, as will be described in more detail below with reference to FIGS. 2A-2C and FIGS. 3A-3C. In some implementations, the robot arm 114 uses the end portion 120 effectively as a hook to pull/hook substrate 116 to retrieve it from the array 118.

Robot arm 114 has an upper surface, generally denoted by reference 122. In this example, the upper surface 122 of the robot arm 114 is generally flat for receiving a semiconductor substrate 116 in an area or portion 123 of the upper surface 122.

Robot arm 114 has a (first) sensor 124 mounted thereon, the purpose of which will be discussed in further detail below with reference to FIGS. 2A-2C to 4A-4D. First sensor 124 has a field of view 126 in which sensor 124 emits a signal and/or receives a reflected signal back. Sensor 124 is configured to transmit a first signal 128 to apparatus 100, to the input module 102. In this example, robot arm 114 also has a second sensor 130 mounted thereon, and the purpose of this will also be discussed in further detail below. Second sensor 130 is configured to transmit a second signal 132 to input 102 of apparatus 100. It is to be noted that it is not essential the second sensor 130 is mounted on the robot arm 114, as will become apparent from the ensuing discussion.

As illustrated in FIG. 1, each of the semiconductor substrates 116 has a generally planar arrangement. In one implementation, one or more of the semiconductor substrates has a generally disc shaped arrangement having a diameter and a thickness 134 along an edge 136 of the substrate 116.

Robot arm 114 and a substrate 116 are arranged for relative movement therebetween. Generally speaking in the following examples, the or each substrate 116 is held stationary, and robot arm 114 moves relative to the semiconductor substrates. However, and as will be described in further detail below, it may be possible that machinery components (not illustrated) operate on a semiconductor substrate 116 and/or array 118 so that these are moved relative to the robot arm 116 for at least part of a mechanical operation of robot arm 114 on semiconductor substrate 116.

Robot arm 114 is arranged for movement in the directions 138 so that it may scan across array 116 in order to move into the general location of a semiconductor substrate 116 upon which it is to operate (for example retrieve). Once in the general vicinity of a target semiconductor substrate 116, robot arm 114 is configured for movement in the directions 140. In this example, directions 140 are generally parallel to an axis (not shown) of one or more semiconductor substrate 116, although other arrangements are envisaged. Moreover, in at least one implementation, the directions 140 are generally perpendicular to directions 138, although other arrangements are contemplated.

Once robot arm 114 moves in to operate on a semiconductor substrate (in the right-hand direction of the arrows 140 in the view of FIG. 1), robot arm is configured for movement in direction 142 for operation on (e.g. retrieval of) the semiconductor substrate 116.

In the example of FIG. 1, detector 104 is implemented in a printed circuit board (PCB) having the necessary components for the operations described below, the component parts including the likes of one or more EEPROMs, and so on. However, other arrangements are possible and it is contemplated that the detector 104 could be implemented in a digital logic controller. As a further alternative, detector 106 could be implemented in a combination of hardware and software with processor 108 and memory 110 having instruction code 112 stored thereon. In this alternative arrangement, apparatus 100 is configured, under control of processor 108 to execute instructions 112 stored in memory 110 to perform the functionality described below.

Concerning sensor 124, this may take one of a number of arrangements. In the example of FIG. 1, sensor 124 may be configured to emit a signal in the direction indicated by reference 126 towards the substrate array 118, and also to receive a signal reflected back from a substrate 116. This is described in greater detail below with reference to FIGS. 3A-3C and 4A-4D. In alternative arrangements, sensor 124 receives only a reflected signal from substrate 116, the original signal having been emitted from a separate emitter (not shown). In at least one implementation, sensor 124 comprises an optical sensor such as a fiber-optic sensor, but other types of sensor are contemplated, including infrared and ultrasonic sensors and the like.

FIGS. 2A-2C to 4A-4D will be described in more detail below but, in summary, FIG. 1 illustrates apparatus 100 for detecting position drift in a machine operation using a robot arm 114, the robot arm 114 being for operation on a semiconductor substrate 116. Robot arm 114 and the semiconductor substrate 116 are configured for relative movement therebetween. Apparatus 100 comprises an input 102 for receiving an input signal 128 from a sensor 124 mounted on robot arm 114. A detector 104 detects, from input signal 128, a detection of there being a predefined distance between the robot arm and the semiconductor substrate (one arrangement therefor being described in more detail with reference to FIGS. 3A-3C and 4A-4D). Apparatus 100 is configured to determine, from the detection, whether there has been position drift.

Further, FIGS. 1 to 5 illustrate a method for detecting position drift in a machine operation using a robot arm 114, the robot arm 114 being for operation on a semiconductor substrate 116. Robot arm 114 and semiconductor substrate 116 are configured for relative movement therebetween. The method comprises receiving an input signal 128 from a sensor 124 mounted on robot arm 114. The method detects, from input signal 128, a detection of there being a predefined distance between the robot arm 114 and the semiconductor substrate 116. From the detection, the method determines whether there has been position drift.

Figure 2A:
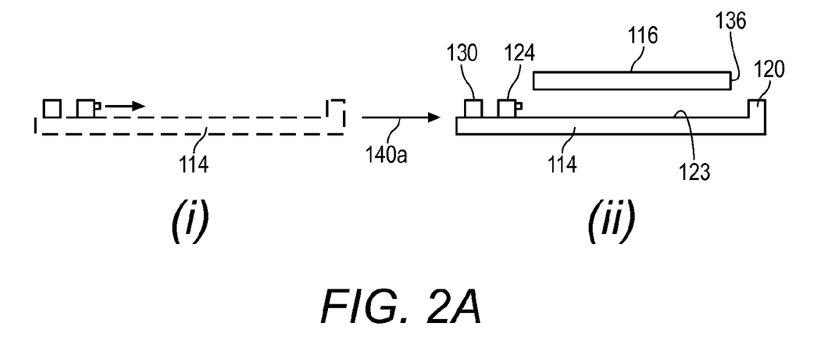
FIGS. 2A-2C are a sequence of schematic block diagrams illustrating a sequence of operation of the robot arm of FIG. 1.
Figure 2B:
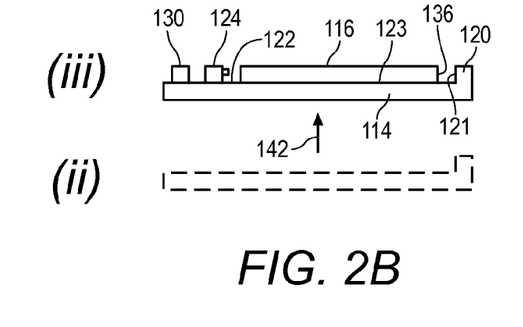
Figure 2C:
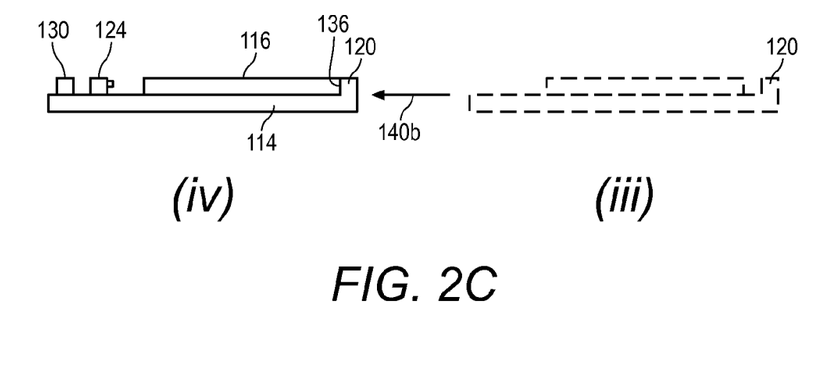

Turning now to FIGS. 2A-2C, one sequence of operation of a robot arm 114 operating on a semiconductor substrate 116 will now be described. In FIGS. 2A-2C, a detailed discussion of the operation of the sensor 114 (and its field of vision 126) is omitted, as this is discussed in more detail with reference to FIGS. 3A-3C and 4A-4D below. Referring first to FIG. 2A, robot arm 114 is shown in a first position (i), corresponding to the position of the robot arm 114 in FIG. 1. In a first movement of operation indicated by arrow 140a, robot arm 114 moves to position (ii) closer to semiconductor substrate 116. Position (ii) is a reference position, the significance of which will be discussed below when discussing FIGS. 3A-3C and 4A-4D. Reference position (ii) is detected by second sensor 130 when robot arm 114 comes to a halt at this position. In the example of FIGS. 2A-2C, second sensor 130 is an accelerometer capable of detecting when motion terminates as the robot arm moves to position (ii) and/or the sensor is stationary. Of course, the sensor 130 may be capable of detecting any instances of the robot arm 114 being stationary but apparatus 100 may also be configured to recognize the detected instance of robot arm 114 being stationary at position (ii) from its knowledge of the operation process and the sequence of movements robot arm 114 is to undertake.

From position (ii), robot arm 114 moves in direction 142 to position (iii) as illustrated in FIG. 2B. In the example of FIG. 2B, robot arm 114 is moved until upper surface 122 of robot arm 114 comes into contact with semiconductor substrate 116, with semiconductor substrate 116 being disposed in the area generally denoted 123. Note, however, that it is not essential for the robot arm to come into direct contact with the semiconductor substrate at this juncture.

As shown in FIG. 2C, the next operation of movement for robot arm 114 is to move from position (iii) to position (iv) in the direction indicated by arrow 140b. During this operation, an inside surface 121 of extended portion 120 comes into contact with edge 136 of semiconductor substrate 116 (which remains stationary while robot arm 114 moves in the direction shown, and continued motion in direction 140b by robot arm 114 retrieves semiconductor substrate 116 from its mount in the cassette/rack. Thus, the semiconductor substrate 116 is retrieved from the rack for further operation thereon, such as cleaning of the semiconductor substrate 116.

As noted above, robot arm 114 and semiconductor substrate 116 are configured for relative movement therebetween. In the example given, the or each substrate 116 is held stationary, and robot arm 114 moves relative to the semiconductor substrates. However, it may be possible that machinery components (not illustrated) operate on a semiconductor substrate 116 and/or array 118 so that these are moved relative to the robot arm 114 for at least part of a mechanical operation of robot arm 114 on semiconductor substrate 116. For instance, when robot arm 114 moves to position (ii), semiconductor substrate 116 may be moved in a direction opposite direction 142 towards robot arm 114, in one example. Thereafter, robot arm 114 is moved as illustrated in FIG. 2C to retrieve the semiconductor substrate 116.

Coming back to second sensor 130, other types of sensors may also be employed for this purpose, such as position detection sensors employing a range of techniques (ultrasonic, infrared etc.) mounted separately from robot arm 114. In some implementations, it may be sufficient for apparatus 100 to detect (or recognize) the reference position from knowledge of the process (the sequence of movements that robot arm 114 is to undertake) and denote the reference position according to when the robot arm (and/or the semiconductor substrate) is expected to be in the reference position. Thus, apparatus 100 is configured to detect the reference position (ii) when robot arm 114 is stationary prior to it being moved to operate on semiconductor substrate 116. In the example of FIGS. 2A-2C, apparatus 100 is configured to detect the reference position from a second input signal 132 received from second sensor 130 mounted on robot arm 114.

FIGS. 3A-3C and 4A-4D may be read together for a better understanding of the operation of apparatus 100 while it monitors for position drift in the machine operation. In this example, apparatus 100 monitors for position drift of the robot arm 114 while it moves through the sequence of movements illustrated in FIGS. 3A-3C, but the techniques disclosed herein are equally applicable for detecting position drift in a machine component for moving the substrate/array, where such operation is employed.

Figure 3A:
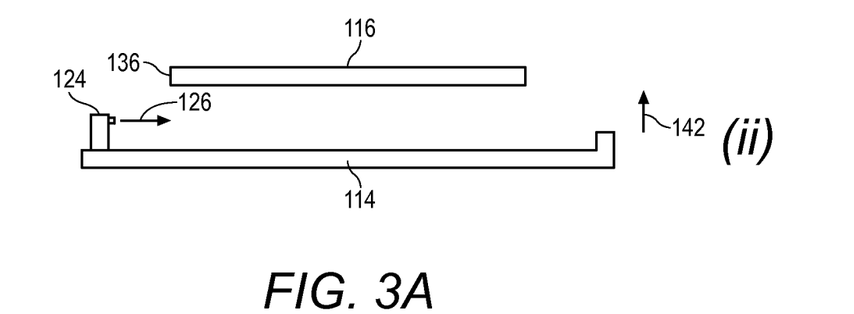
FIGS. 3A-3C are a sequence of schematic block diagrams illustrating a technique for detecting position drift of the robot arm of FIG. 1.
Figure 3B:
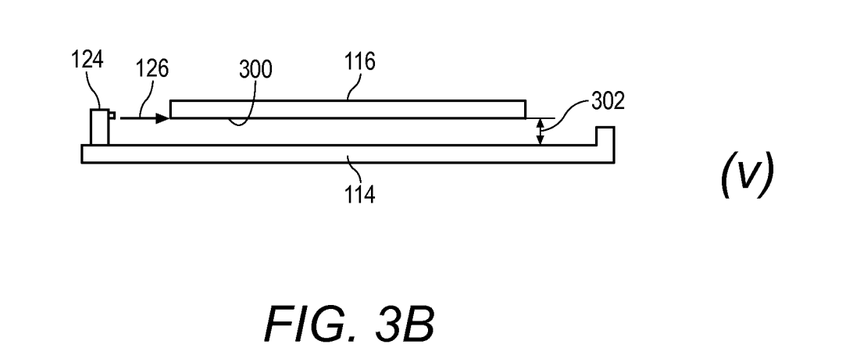
Figure 3C:
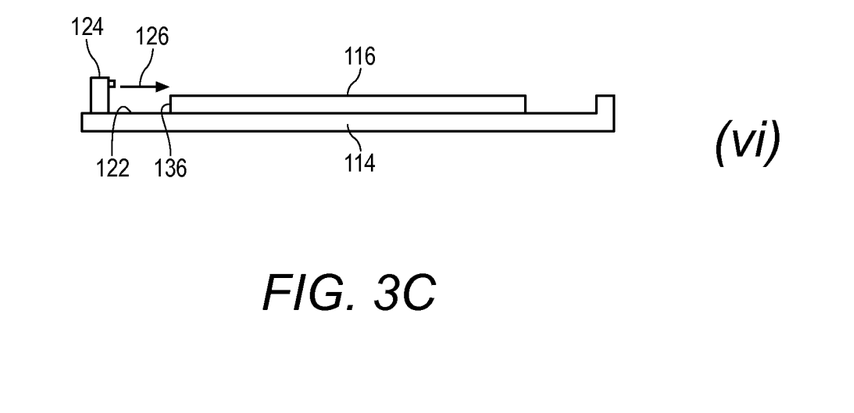

FIGS. 3A-3C show in more detail the movement of the robot arm 114 from position (ii) to position (iii) in FIGS. 2A-2C. Operation of sensor 124, particularly with respect to its field of vision 126 and how that a significant, is described in more detail now. FIGS. 4A-4D illustrate a series of traces 400 received at apparatus 100 from sensor 126, the nature of the traces 400 being dependent on the distances between the robot arm 114 and the semiconductor substrate 116, and depending on the sensing techniques used by sensor 124.

FIG. 3A shows again robot arm 114 being in reference position (ii), about to move in the direction indicated by arrow 142. As robot arm 114 moves in direction 142, it comes to a position (v), this position being intermediate positions (ii) and (iii), and in position (v), field of vision 126 of sensor 124 is aligned with an underside 300 of semiconductor substrate 116. In this example, sensor 124 is configured to emit a signal towards substrate 116, and receive a reflected signal back therefrom. Thus, a reflected signal received at sensor 124 will indicate when the field of vision 126 of sensor 124 is aligned with the substrate 116, more specifically in this example, an edge 136 of substrate 116. At this point, it is known that robot arm 114 is a distance 302 from robot arm 116. Apparatus 100 is configured to detect the field of vision 126 of sensor 124 being aligned with the substrate 116, by detecting a change in the signal 128. For instance, and referring to FIG. 4A, this illustrates a trace 400 of the received signal 128, as a graph of intensity of received, reflected signal as the distance between robot arm 114 (or, more specifically, the field of vision of sensor 124 mounted on robot arm 114) and semiconductor substrate 116 varies. Thus, the received signal undergoes a significant change in intensity at or near the line 402, at the instance illustrated in FIG. 3B when the field of vision 126 of sensor 124 is aligned with the underside 300 of semiconductor substrate 116. Thus, the reflected signal received at sensor 124 is of a higher intensity.

Figure 4A:
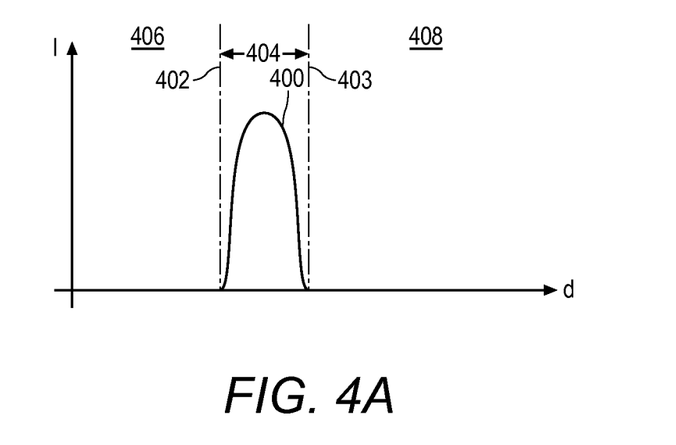
FIGS. 4A-4D are a sequence of trace diagrams illustrating a sequence of traces of sensed signals received at the apparatus of FIG. 1.

In instances where the field of vision is focused—for example, the emitted energy from sensor 124 is a focused light beam—the profile of the received signal will correspond to that illustrated in FIG. 4A. As robot arm 114 continues to move toward semiconductor substrate 116, the increased intensity in the received signal is maintained generally constant as the field of vision 126 of sensor 124 passes across edge 136 of substrate 116 until, at instance 403, robot arm 114 moves relative semiconductor substrate 116 so far that the field of vision 126 goes beyond upper surface 122 of semiconductor substrate 116. That is, the field of vision 126 is no longer in alignment with edge 136 of semiconductor substrate 122, and the intensity of the signal received at sensor 124 is reduced. In this example, the instant at which the intensity drops can correspond to line 403 in FIG. 4A, and the region 404 corresponds to the duration of travel of the field of vision 126 of sensor 124 across edge 136 of the substrate. Thus, apparatus 100 is configured to receive the input signal 128 as a signal indicating the sensor 124 is an alignment with an edge 136 of the semiconductor substrate 116.

Accordingly, region 406 in the graph of FIG. 4A to the left the region 404 and region 408 to the right of region 404 indicate operation when the field of vision 126 is not aligned with the edge 136 of substrate 116.

In instances where the field of vision 126 is not as focused as in the example of FIG. 4A—for example it is divergent, and can receive reflected signals from multiple angles and/or the emitted beam is divergent, with the intensity of the beam varying across its field of vision—the received trace signal may be similar to trace signals 400a, 400b, 400c in FIGS. 4B to 4D, discussed in more detail below.

Detection of a change in intensity of the received signal at line 402, in combination with knowledge of the physical arrangement of the machine components allows a determination of whether the change in intensity is at an expected time. For instance, the time it should take, or the distance that should be traveled, between the reference position (ii) and position (v) is known, and the comparison of this with the actual time taken or distance traveled (the "motion information") for line 402 (and an increase in the intensity of the received signal) to be detected, allows a determination of whether or not the robot arm has maintained its position or not. For instance, if the increase in intensity happens before it is expected, then it is known that robot arm 104 has reached position (v) earlier than expected, the most likely explanation being that there has been position drift of the robot arm towards substrate 116. If the increase in intensity happens after it is expected, then it is known that robot arm 104 has reached position (v) later than expected, indicating position drift of the robot arm away from substrate 116. Examples of this are given with respect to FIGS. 4B to 4D.

Figure 4B:
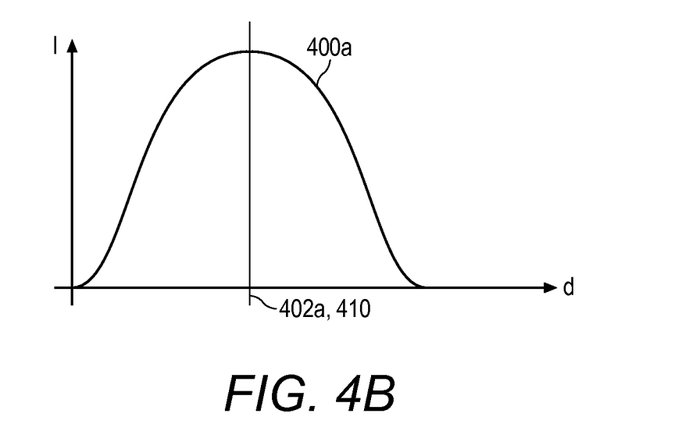
Figure 4C:
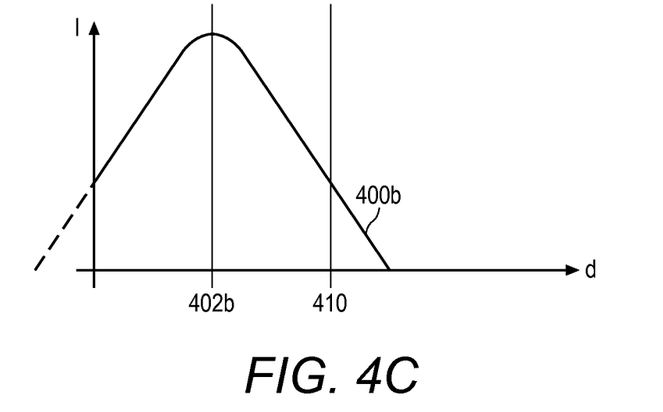

In FIG. 4B, the detection of the peak at instance 402a is coincident with the expected time at instance 410 and, thus, it is known robot arm 114 has not suffered from position drift, and is still in its calibrated position. In FIG. 4C, the peak in the received signal 400b is detected at instance 402b, but this is before its expected time, indicated by instance 410. Therefore, it is known that the peak intensity in the received signal has been detected in advance of when it was expected, thereby indicating that robot arm 114 has traveled a shorter distance—or has been moving for a shorter than expected time—prior to alignment of field of vision 126 of sensor 124 with the edge 136 (say, at the corner of edge 136 with underside 300) of substrate 116. This indicates position drift towards the substrate 116. Apparatus 100 may be configured to detect this peak earlier than expected and flag an alarm to this effect. Machinery components such as the robot arm 114 may be configured to stop operation at this point for, otherwise, continued operation of the robot arm may lead to damage of the semiconductor substrate 116, obviously a highly undesirable situation.

Figure 4D:
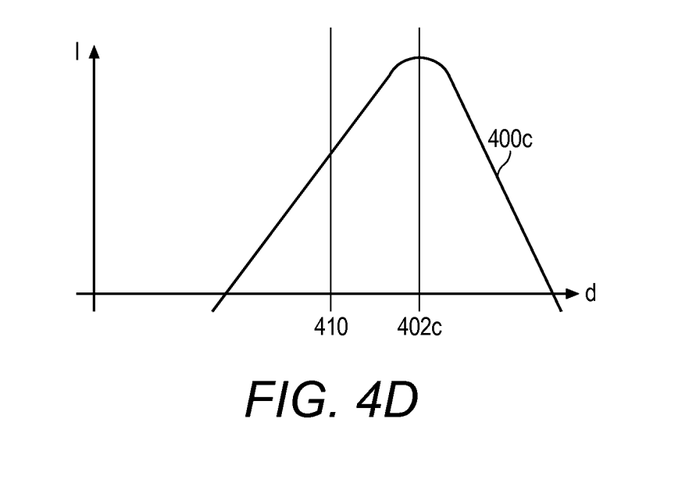

FIG. 4D shows an alternative scenario in which the peak at 402c of trace 400c is detected after the expected occurrence of this at instance 410. This indicates that robot arm 114 has traveled a longer distance—or has been moving for a longer than expected time—prior to alignment of field of vision 126 of sensor 124 with substrate 116, thus indicating position drift away from substrate 116. This is also a potentially highly undesirable situation because if the position drift is too far away from the target substrate 116, movement of the robot arm may damage neighboring substrates (not illustrated). Implementation of the techniques disclosed herein may obviate any damage to a neighboring substrate, by detecting position drift—a gradual process—before it become so bad as to threaten damage to the neighboring substrate.

So, apparatus 100 is configured to detect whether there has been position drift by deriving motion information relating to an action of relative movement between the robot arm and the semiconductor substrate, the motion information relating to motion from a reference position to the predefined distance between the robot arm and the semiconductor substrate, and by comparing the motion information with expected information for the action of relative movement.

As noted above, the motion information can be information relating to an expected amount of time to move from the reference position to position (v), or a known distance to move between the two positions. Thus, in the former scenario, apparatus 100 is configured to derive the motion information as timing information relating to a Peter of time for the robot arm 114 to move from reference position (ii) to the predefined distance 302 from substrate 116. In the latter scenario, apparatus 100 is configured to derive the motion information as distance information relating to a distance of travel for the robot arm to move from the reference position to the predefined distance from the semiconductor substrate.

If working on timing information, this can be derived from, say, the time the movement of robot arm 114 into the reference position is detected by sensor (Excel automata) 130. The time for robot arm 114 to move to the pre-defined distance from the semiconductor substrate once it arrives at the reference position may be assumed from knowledge of the process during calibration. Alternatively, it may be derived from when robot arm 114 begins to move again after it has come to rest in the reference position, but this may require a sensitive sensor to be able to detect commencement of movement once more.

Figure 5:
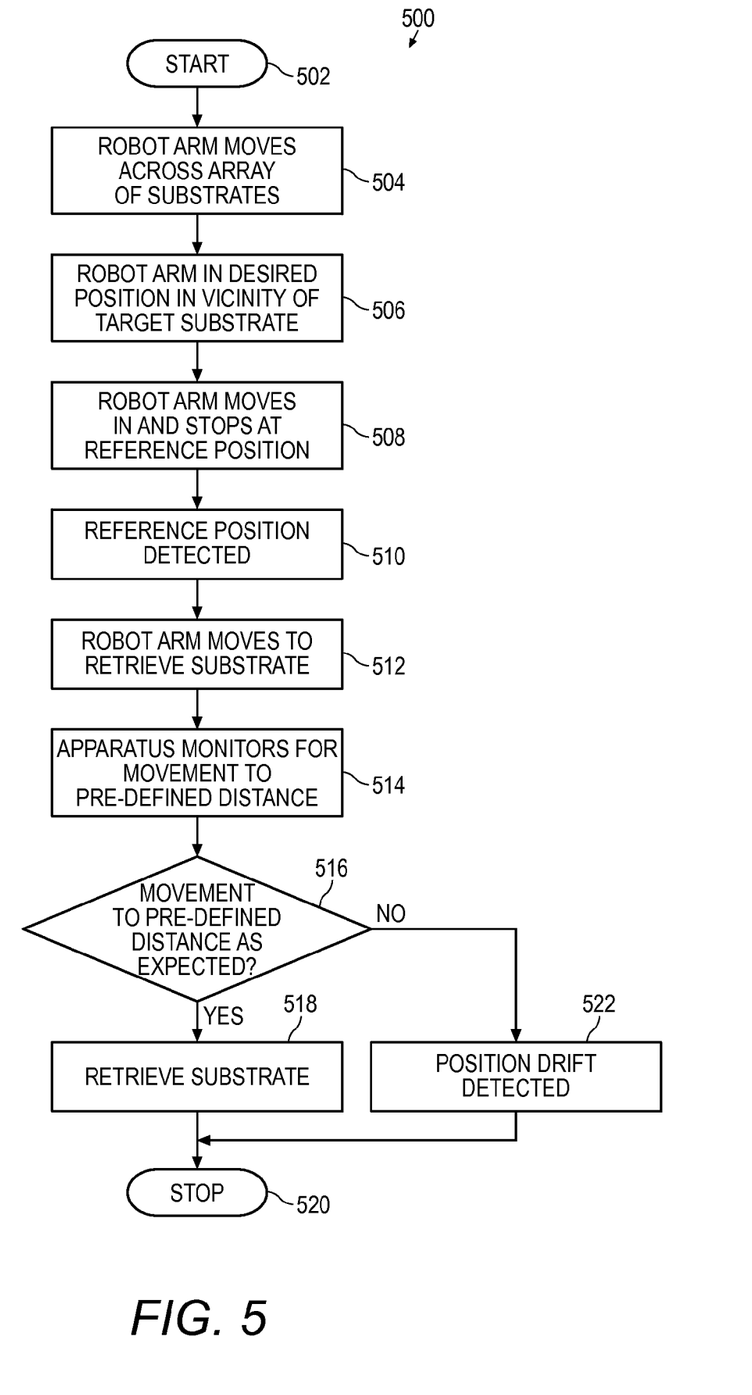
FIG. 5 is a process flow diagram illustrating a process for a sequence of operation of the robot arm, and a method for detecting position drift of the robot arm.

FIG. 5 provides a summary of the process as described above with reference to FIGS. 1 to 4A-4D. In summary, the process 500 starts at 502. At 504, the robot arm 114 moves across the array 118 of substrates 116 in one of the directions 138. At 506, robot arm 114 is detected to be in the vicinity of the target substrate and at 508 moves in (in direction 104a in FIG. 2A) and stops at reference position (ii). At 510, apparatus 100 detects that the reference position has been arrived at—using, for example, the signal from second sensor (accelerometer) 130—and at 512 robot arm 114 moves in direction 142 to retrieve substrate 116. Apparatus 100 monitors for movement of the substrate to the predefined distance 302 at step 514, while the robot arm 114 continues to move in direction 142. At step 516, detector 104 (or detector 106) detects movement to the predefined distance—e.g. the peak 402 in the sensed signal (or other increase in intensity of the reflected signal) is detected—and determines whether the movement to the pre-defined distance is as expected. If the detection is as expected, apparatus 100 knows that there has been no position drift of robot arm 114 or that it is within acceptable tolerances and at step 518, robot arm 518 moves to retrieve the substrate as illustrated in FIGS. 2A-2C and 3A-3C. On the other hand, if the movement to the predefined distance is not as expected by apparatus 100 at step 516 (or is outside acceptable tolerances), position drift is detected at step 522. At this time, apparatus 100 may generate an alarm indicating position drift and may inhibit robot arm 114 from further operation to avoid damage to any machine components or to any of the substrates. The process ends at step 520.

The foregoing description has been given in the context of the robot arm 114 being arranged to operate on—for example, retrieve—a semiconductor substrate 116 from an array (e.g. cassette or rack) thereof. However, the techniques disclosed herein may have broader application and may be applied to detecting position drift of any machine component operating on a target object. Thus, an apparatus for detecting position drift of a machine component, the machine component being for operation on a target object, the machine component and the target object being configured for relative movement therebetween comprises an input for receiving an input signal from a sensor mounted on the machine component. A detector detects, from the input signal, a detection of there being a predefined distance between the machine component and the target object. The apparatus is configured to determine, from the detection, whether there has been position drift of the machine component.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

What is claimed is:

1. Position drift detection apparatus configured to detect position drift in a machine operation using a robot arm, the robot arm being for operation on a semiconductor substrate, the robot arm and the semiconductor substrate being configured for relative movement therebetween, the apparatus comprising:
   an input for receiving an input signal from a sensor mounted on the robot arm;
   a detector for detecting, from the input signal, a detection of there being a predefined distance between the robot arm and the semiconductor substrate; wherein
   the apparatus is configured to determine, from the detection, whether there has been position drift.

2. The apparatus of claim 1, configured to detect whether there has been position drift by deriving motion information relating to an action of relative movement between the robot arm and the semiconductor substrate, the motion information relating to motion from a reference position to the predefined distance between the robot arm and the semiconductor substrate, and by comparing the motion information with expected information for the action of relative movement.

3. The apparatus of claim 2, configured to detect the reference position as a position of one of the robot arm and the semiconductor substrate when the one of the robot arm and the semiconductor substrate is stationary prior to relative movement being effected therebetween for the robot arm to operate on the semiconductor substrate.

4. The apparatus of claim 3, configured to detect the reference position when the robot arm is stationary prior to it being moved to operate on the semiconductor substrate.

5. The apparatus of claim 4, configured to detect the reference position from a second input signal received from a second sensor mounted on the robot arm.

6. The apparatus of claim 2, configured to derive the motion information as timing information relating to a period of time for the robot arm to move from the reference position to the predefined distance from the semiconductor substrate.

7. The apparatus of claim 2, configured to derive the motion information as distance information relating to a distance of travel for the robot arm to move from the reference position to the predefined distance from the semiconductor substrate.

8. The apparatus of claim 1, configured to receive the input signal as a signal indicating the sensor is in alignment with an edge of the semiconductor substrate.

9. A method of detecting position drift in a machine operation using a robot arm, the robot arm being for operation on a semiconductor substrate, the robot arm and the semiconductor substrate configured for relative movement therebetween, the method comprising:
receiving an input signal from a sensor mounted on the robot arm;
detecting, from the input signal, a detection of there being a predefined distance between the robot arm and the semiconductor substrate; and
determining, from the detection, whether there has been position drift.

10. The apparatus of claim 1, configured to detect, from the input signal, detection of the predefined distance between the robot arm and the semiconductor substrate when relative movement is effected therebetween in a direction transverse or generally transverse a plane of the semiconductor substrate.

* * * * *